United States Patent [19]

Anderson et al.

[11] Patent Number: 4,962,279
[45] Date of Patent: *Oct. 9, 1990

[54] KAOLIN CALCINER WASTE HEAT AND FEED RECOVERY PROCESS

[75] Inventors: Charles D. Anderson; Carl S. Cummings, both of Warthen; J. Richard Hudson, McIntyre, all of Ga.

[73] Assignee: ECC America Inc., Atlanta, Ga.

[*] Notice: The portion of the term of this Patent subsequent to Jan. 5, 2005, has been disclaimed.

[21] Appl. No.: 307,206

[22] Filed: Feb. 3, 1989

Related U.S. Application Data

[63] Continuation of Ser. No. 917,657, Oct. 9, 1986, abandoned, which is a continuation-in-part of Ser. No. 870,222, Jun. 3, 1986, Pat. No. 4,717,559.

[51] Int. Cl.$^5$ .................................................. C04B 33/04
[52] U.S. Cl. ..................................... 501/150; 423/111; 106/770; 106/486
[58] Field of Search .................... 501/150; 106/288 B; 423/111

[56] References Cited

U.S. PATENT DOCUMENTS

| | | | |
|---|---|---|---|
| 3,309,214 | 3/1967 | Podschus et al. | 501/150 |
| 3,586,523 | 6/1971 | Fanselow et al. | 501/150 |
| 3,941,872 | 3/1976 | Puskar | 423/111 |
| 4,246,039 | 1/1981 | Mixon, Jr. | 501/150 |
| 4,381,948 | 5/1983 | McConnell et al. | 501/145 |
| 4,642,904 | 2/1987 | Smith, Jr. | 34/9 |
| 4,717,559 | 1/1988 | Cummings et al. | 423/328 |

OTHER PUBLICATIONS

Perry's Chemical Engineer's Handbook, pp. 20–54, McGraw Hill, N.Y., 1984.
"New–Generation Flash Dryers Boost Lime Kiln Production, Save Fuel", by Paul A. Humbert, Feb. 1980.

Primary Examiner—Robert L. Stoll
Assistant Examiner—Paige C. Harvey
Attorney, Agent, or Firm—Klauber & Jackson

[57] ABSTRACT

An improvement is disclosed applicable to the production of calcined and hydrous kaolins in particulate form. A process and system are disclosed in which the calciner is integrated with a filtration process and a preceding spray dryer by passing the dust-laden calciner hot off-gases to the spray dryer to achieve savings in energy. Waste heat from the calciner, and concomitantly dustlike clay particles carried in the off-gas, are thereby passed to the dryer and subsequently treated and their values recovered.

14 Claims, 4 Drawing Sheets

KAOLIN CALCINER WASTE HEAT AND FEED RECOVERY PROCESS

CROSS REFERENCE TO RELATED APPLICATION

This application is a continuation of application Ser. No. 917,657, filed Oct. 9, 1986, now abandoned, which is a continuation-in-part of U.S. application Ser. No. 870,222 filed June 3, 1986 now U.S. Pat. No. 4,717,559.

FIELD OF THE INVENTION

This invention relates generally to the production of calcined and hydrous kaolins in particulate form, suitable e.g. for use as filler or coating pigments in the manufacture of paper and paperboard products or as pigments for fillers in paints, rubbers and plastics. More specifically, the invention relates to a process and system in which the kiln is integrated with processing units, including a dust filter and a spray dryer by conducting the dust-laden kiln hot off-gases to the spray dryer and elsewhere to achieve savings in energy, to recover entrained kaolin and to avoid environmental pollution. Waste heat from the kiln, and concomitantly dust-like clay particles carried in the off-gas, are passed to the drier and to other units and their values recovered.

BACKGROUND OF THE INVENTION

Calcined kaolin pigments have found increasing acceptance in paper manufacture, where they are particularly useful as fillers in or for coating of paper and paperboard products. Such pigments are also widely used as fillers in paints, rubbers and plastics. In the usual process for preparing such a pigment, a selected kaolin crude, after mining, is generally worked up by washing, classifying, and if desired, by other types of beneficiation. After such treatment, including filtration, the kaolin results as an aqueous slurry. The slurry is then dried, typically by spray drying, may then be pulverized, and is calcined. The present invention relates particularly to the spray drying/calcining, associated steps, to the dryer feed preparation steps and to the integration of these steps.

The general techniques thus utilized in preparing calcined kaolins are discussed in a number of prior art patents. For example, Fanselow et al, U.S. Pat. No. 3,586,523 describes the production of a calcined kaolin filler pigment, in which the starting material, a fine particle-sized kaolin crude is crushed dispersed in water, degritted, classified to remove nearly all particles larger than about 2 microns ESD (equivalent spherical diameter), and chemically bleached with or without flotation beneficiation. The bleaching step involves a filtration step and, specifically, the filter cake from bleaching containing about 60% solids, is fluidized by adding a small amount of ammonium hydroxide. The dispersed slip is spray dried, pulverized, calcined and again pulverized. This patent, therefore, describes some basic operations in the production of calcined kaolin pigments, but nothing is said about using the calciner hot off-gases for any purpose.

This is also true of *McConnell et al*, U.S. Pat. No. 4,381,948, which describes the preparation of a kaolin clay pigment consisting of high light-scattering porous aggregates of kaolin clay platelets, having certain properties of specific gravity, porosity and size distribution. The method of preparation typically comprises forming an aqueous dispersion of the crude clay at e.g. 60% solids, diluting with water to 15% solids degritting, and subjecting to a particle size separation by centrifuging. From such separation a kaolin slurry of clay is recovered in which substantially all particles are less than 1 micron ESD. The slurry is dried by spray drying, pulverized, calcined under controlled temperature conditions, and again pulverized.

In *Podschus et al*, U.S. Pat. 3,309,214, a process is disclosed for the preparation of calcined kaolin pigments from kaolin clays. The crude kaolin is worked up by washing, classifying, etc., and after such treatment results as an aqueous slurry of about 50% by weight solids. It is then subjected to two calcining treatments, the first of which is known as "shock calcination", and the second of which is of the conventional type. Shock calcination is effected in a highly turbulent hot gas stream introduced into a conical reaction chamber at high velocity, in which the kaolin is heated to a temperature between 600° to 1000° C. for a period of not more than one second. The second calcination is effected at a temperature between about 800° to 1100° C. for a time of at least 10 minutes, e.g. one hour, in a conventional furnace such as a muffle furnace. Prior to said first calcination, the kaolin may be dried, preferably by the hot gases of the shock calcination furnace, at temperatures below about 400° C. to about 500° C. as it is desirable to prevent the kaolin from being dehydrated, since the shock calcination of kaolin which is already partially dehydrated is less effective. That is, the heating of the wet kaolin may be effected in two stages instead of in a single stage, but in both instances by the same source of heat. It may be noted that there is no cooperation between the second calciner and a spray drier (none is used), and no fuel savings are realized from the off-gas of the second calciner.

An article by Paul A. Humbert in *Pulp and Paper*, February, 1980, describes the use of a flash dryer with a lime kiln. In the flash-drier arrangement, washed lime mud containing 30% to 40% moisture is conveyed from the recovery system centrifuge or vacuum filter (normally the final stage before drying and calcining in the kiln) to a mixer, where it is combined with a portion of dried material from the system cyclone. By properly blending dry and wet materials, the feed is conditioned for more efficient drying while eliminating the handling problems associated with wet calcium carbonate sludge. The conditioned feed is then discharged into the flash dryer-cage mill where it contacts the hot gas stream from the cold end of the kiln. These gases are now at 1000° F. to 1200° F., hotter than normal. Because dry material is being fed to the kiln, the drying operation has been moved from the kiln to the flash dryer. The cage mill disintegrates lumps of calcium carbonate, mixing the hot gas stream with the fine particles. The hot gas stream conveys the material through the uptake duct to the cyclone, simultaneously drying it to 1% moisture. The dry material is separated from the air stream in the cyclone and discharged into a dry divider where a portion is returned to the mixer for conditioning the feed. The remainder is fed to the kiln for calcination. Since it is necessary to split the dried material and return one portion to the mixer where it contacts wet feed so as to condition the wet feed for more efficient drying, it follows that there is recycling of some dried material through the flash dryer. Fuel savings are said to be just under 10% to over 30%. On the other hand, in the subject process, the process steps are not comparable and fuel savings can be in a higher range. Furthermore, the calcium carbonate feed is not a kaolin, and does not have the properties of a kaolin.

Mixon, Jr., U.S. Pat. No. 4,246,039 discloses the wet processing of kaolin in which an electrically-augmented vacuum filter, designated "EAVF", is used to partially dewater an aqueous slurry. In the process, a kaolin slurry containing less than 45% solids is preheated by direct heat exchange with hot stack exhaust from a clay calciner in a wet scrubber. The exhaust gas is typically in the range of 800° to 1000° F. and the slurry is heated from ambient temperature to a temperature above 100° F., e.g. in the range of 125° to 140° F., with some water being evaporated to increase solids by 2 to 5 weight percent. The use of preheated feed to the electrofilter is said to reduce the energy demands of the electrofilter and as preconcentrated slurry is discharged from that apparatus and fed to the spray dryer at elevated temperature, to reduce energy requirements to operate the spray dryer. The exhaust gas from the kiln contains small amounts of particulates, including fine calcined clay particles which are introduced into the clay slurry in the wet scrubber. However, the EAVF filter is a complex means of removing water. Its operation involves electrolytic dissociation of the water. Hydrogen gas, sodium ions and hydroxide ions form at the cathodes. Oxygen and hydrogen ions accumulate at the anodes. Clay collects on the anode surfaces. The apparatus includes an overhead traveling carriage equipped with hoists to raise an anode vertically out of the slurry and return it vertically to the slurry. Doctor blades associated with the traveling carriage are constructed to scrape the clay filter cake from the surfaces of the anodes before they are resubmerged in the clay suspension. Over long-term use it would be subject to breakdown/repair.

Conventionally, however, the exhaust gas from the calciner is fed to a wet scrubber which takes out the dust particles and the gas is vented. Wet scrubbing is resorted to in order to meet governmental dust attainment requirements for the vented air. However, the dust so removed is in the form of a very dilute aqueous suspension, and although the suspension could theoretically be filtered and the product dried, such process is uneconomical. Accordingly, the suspension is discharged to waste, thereby adding to the cost of waste disposal.

In principle, it might be thought that one could directly collect the dust in the calciner exhaust gas by means of a conventional bag dust collecting system, but the fabrics used in such collectors cannot withstand the high temperatures which would be encountered at the exhaust from the calciner, typically about 1000° F.

Accordingly, the present invention is directed to a practical method and system, which functions to reduce the energy requirements associated with the wet processing of kaolin to dry, calcined particles, and which further, provides for recovering and eliminating the fines in the calciner exhaust gas.

BRIEF SUMMARY OF THE INVENTION

According to the present invention, one or more kilns are integrated with one or more spray dryers and one or more air heaters—an air heater as used herein is a combustor in which fuel is burned to heat air for supply to a dryer or dryers—and other processing equipment to utilize to the maximum the heat contained in the exhaust gas issuing from the kiln, and in the heated air, and to recover effectively the fines contained in the exhaust gas. The kiln exhaust gas (with the entrained calciner dust) is passed to a spray dryer to supplement the hot air from an air heater, preferably joining the heated air in a conduit connecting the heater to the dryer. The amount of heated air can therefore be reduced, with a corresponding reduction of the amount of fuel burned in the heater.

The flow pattern through the spray dryer is arranged to permit the particulate material in the hot stack gases to flow through the upper regions of the spray dryer into dust collectors associated with the dryer and communicating therewith. After the heated air and gases pass through the dust collectors they traverse a heat transfer unit in the nature of a packed scrubber wherein they come into direct contact with water moving counter-currently to the gaseous flow and the exhaust gases and air transfer their sensible heat to the water as well as the latent heat of contained water vapor, which condenses. The heated water is then used upstream to heat the feed stream which eventually supplies the spray dryer or dryers. In particular, the heated water is used to heat the feed to a filter which is a necessary prior processing unit, to facilitate the filtration process from which is produced the aqueous kaolin slurry which is fed to the spray dryer to which the kiln exhaust gases are originally supplied as well as to other dryers for processing of hydrous kaolin that may be utilized. This facilitates the spray drying and effectively makes use in an integrated system of the waste BTU's in the gases issuing from the kiln and in the heated air from the air heater. Thus, this utilization of heat and fines removal is accomplished by connecting the kiln feed with the supply chain leading to the kiln and by connecting the kiln waste effluent with that supply chain.

By this simplified means, exceptional savings in energy can be achieved, as well as effective recovery and removal of calciner dust particles entrained with the kiln gas.

Thus, the invention comprises first diverting the calciner exhaust gas to a spray dryer or dryers, thereby utilizing some of the heat of the gas to dry the incoming kaolin feed, including feed for the calciner, and simultaneously partially cooling the exhaust gas. The said cooled gas, mixed with the partially cooled heated air, the two being now sufficiently cooled, being subsequently passed through a bag filter dust collector, thereby recovering the calciner dust, which may then be reunited with the main dry kaolin feed to the calciner. Thereafter, any remaining fines are removed from the gaseous effluent and the heat values in the waste gas and air are used to heat a stream of water which is utilized, inter alia, to facilitate the preparation of the dryer kaolin feed, at least a portion of which eventually reaches the kiln. In some cases, the spray-dried product is used as such. In accordance with the invention, the waste heat is captured in a form in which it can not only facilitate the preparation of dryer feed but it can also be used for other purposes in the operation, such as space heating and the like. The gases from one or more spray dryers can be used in a single water-heating operation.

The typically 1000° F., flue gas is well suited to be introduced into a spray dryer, because this is typical of the gas temperatures desired there. Thermodynamically it is efficient to employ a high-temperature level waste-heat stream for a heat duty where high-level heat is required, as contrasted with using it for a job where a low-level waste heat stream, which might be available, would be adequate.

BRIEF DESCRIPTION OF THE DRAWINGS

The invention is diagramatically illustrated, by way of example, in the drawings appended hereto, in which.

DESCRIPTION OF PREFERRED EMBODIMENTS

Figure 1:
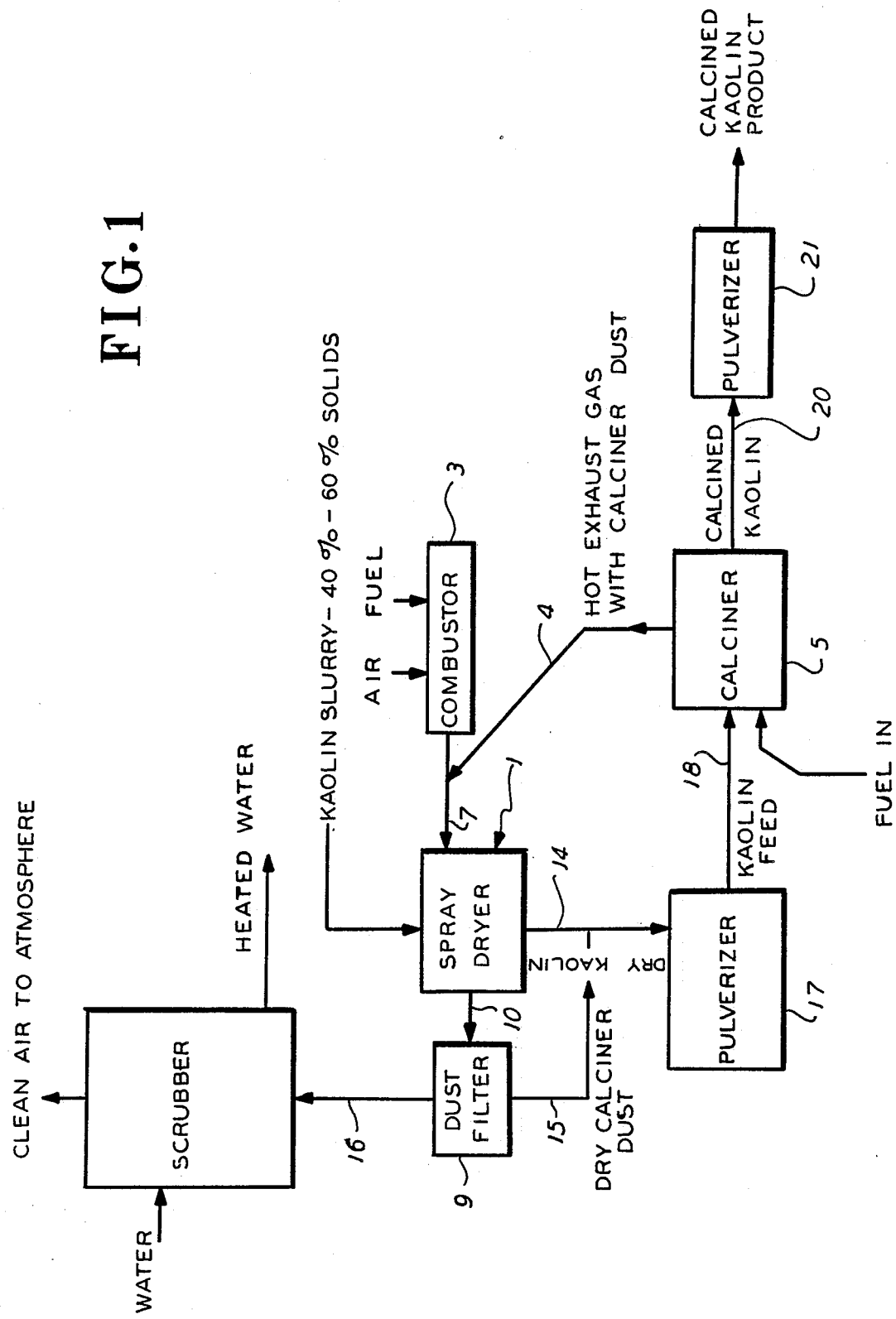
FIG. 1 is a schematic block diagram showing a typical plant layout embodying a system in accordance with the present invention.
Figure 2:
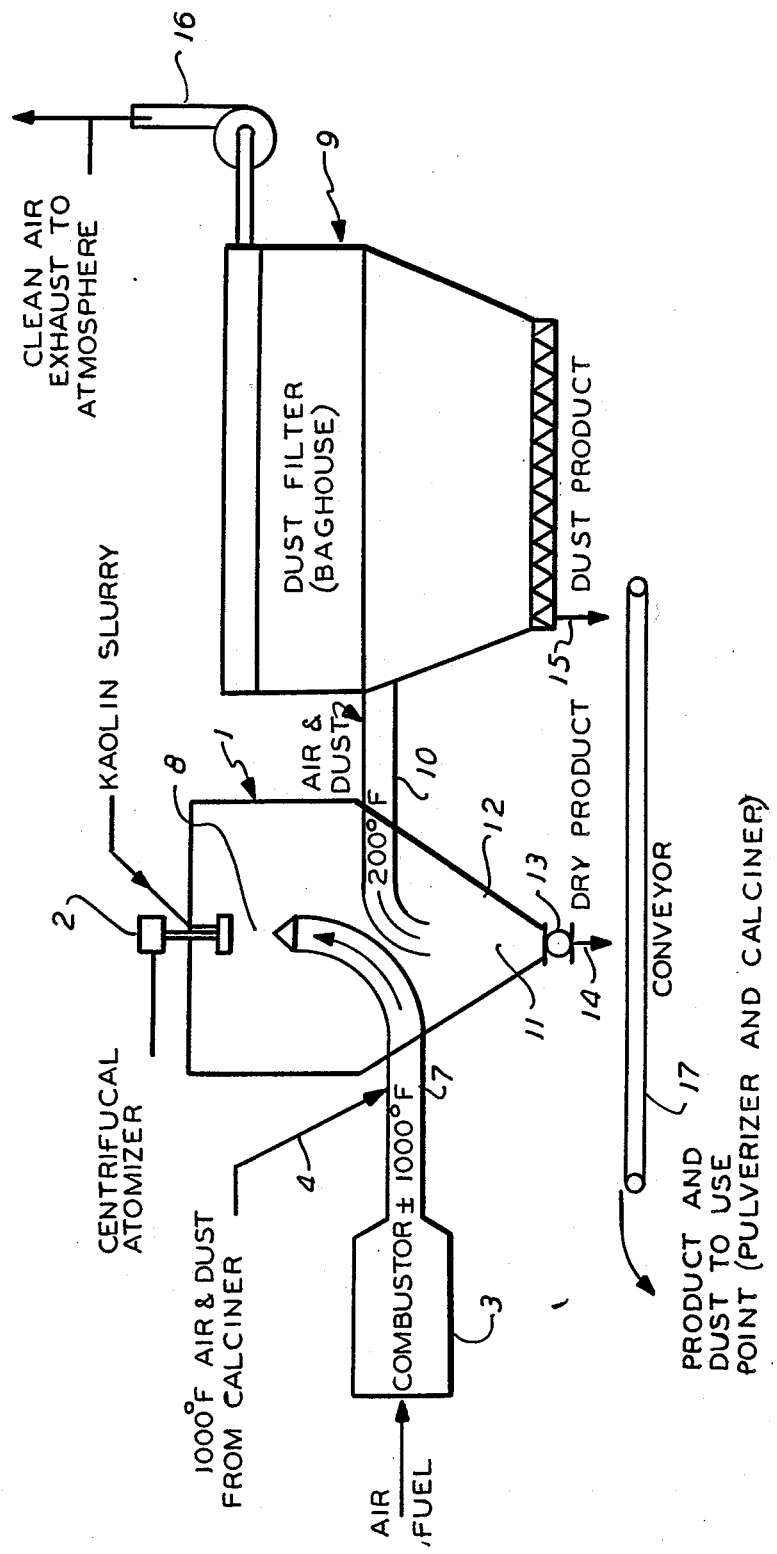
FIG. 2 is a schematic diagram of a portion of the FIG. 1 system, and illustrating the manner in which the spray dryer, combustor and dust filter components are arranged, including details with respect to the flow of exhaust gas from a calciner carrying fine particulate clay material.

As shown in FIGS. 1 and 2, a spray dryer 1, which can be of generally conventional construction, receives an aqueous kaolin clay slurry, which is suitably introduced through centrifugal atomizer 2 (FIG. 2) and atomized. The slurry can include from about 35% to 65% solids, although 40% to 60% solids is preferred. Air and fuel are supplied to a combustor 3 and the fuel is burned to give a gaseous stream at an elevated temperature suitable for drying the slurry, for example at 1000° F. Exhaust gas from calciner 5, at a temperature in the range of about 800° to 1000° F., preferably about 1000° F., comprising air and calciner dust, i.e. clay fines, is introduced into spray dryer 1, preferably by joining it with the hot air stream from combustor 3, by connecting the line 4 from the calciner to the line or conduit 7 connecting combustor 3 to the spray dryer. Although the calciner dust includes some dehydroxylated kaolin, the bulk of such dust is found to be substantially uncalcined kaolin, whereby it is desirable to recover such dust for use as a feed for the kiln.

The conduit 7 opens into the central, upper portion 8 of dryer 1 (FIG. 2) adjacent the atomizer 2, whereby the hot gaseous stream contacts the incoming kaolin slurry to dry it. A dust filter 9, comprising one or more bags, is located adjacent spray dryer 1, and is connected thereto by a duct 10, the input of which opens into a lower portion 11 of dryer 1. Dried clay particles fall by gravity through the lower, generally coneshaped portion 12 of dryer 1, and exit via bottom outlet 13 and line 14; simultaneously, air and exhaust gases reduced in temperature, for example at 200° F., by the drying process, and carrying kaolin fines, pass into the dust bag of dust filter 9 via line 10. The temperature of this gaseous stream now is within the temperature tolerance of the dust bag. The gaseous stream in line 10, on passing into the larger diameter dust bag, deposits the fines at the bottom, which exit through line 15 and substantially clean air is exhausted via conduit 16. A conveyor 17 carries away the dried clay product exiting the dryer via outlet 13 and line 14, together with the dust product leaving the dust bag via line 15.

In the schematic plant layout of FIG. 1, dry kaolin from dryer 1 in line 14, is joined by dry calciner dust from the bag collector in line 15, and is passed to pulverizer 17. The pulverized output is passed by line 18 to the conventional calciner 5, which can be a Hereschoff or other type furnace, where it is calcined. The calcined kaolin is then passed via line 20 to pulverizer 21, and calcined kaolin product is removed therefrom.

Figure 3:
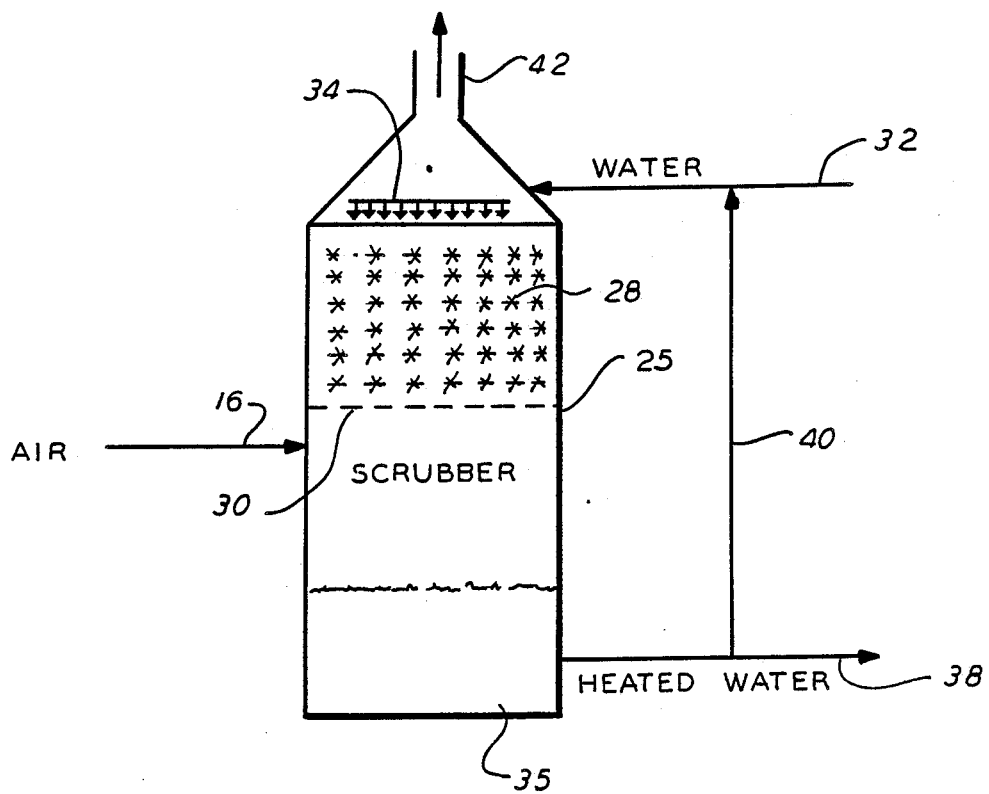
FIG. 3 is a schematic view of a scrubber employed in accordance with a preferred embodiment of the present invention.

The air in conduit 16, e.g. at about 200° F., is passed to a packed scrubber 25 wherein it is brought into direct counter-current contact with water. Thus, referring to FIG. 3, the scrubber 25 is provided with packing 28 which may be of any convenient type e.g. rings or saddles such as raschig rings, and products known under the names Flexrings, Flexisaddles, Pawlrings and Tripax, or the like, and which is supported in the upper portion of the scrubber on a perforated plate 30. Water which, as will be described below, is recirculated to the scrubber 25 and is e.g. at a temperature of about 100° F., is introduced into the upper part of the scrubber via a line 32 and is fed to a distributor or spray head 34 which distributes it evenly over the top of the packing 28. At the same time, the gaseous exhaust in line 16 is introduced into scrubber 25 at a point below the plate 30 in a tangential manner and flows upwardly toward the top of the scrubber in counter-current contact with the downwardly-flowing water. In practice, the gas upon entering the bottom of the packed bed 28 cools instantaneously from its entering temperature and, once at its dew point, the rising gas is cooled via direct contact with the water such that as its temperature drops water vapor in the rising gas is condensed. This results in a net water production in the cooler and contributes latent heat as well as sensible heat to the water fed through line 32 and which moves downwardly through the packed bed 28. After passing through the packed bed 28 and in contact with the upwardly-flowing gaseous stream, the water is collected in a pool 35 at the bottom of the scrubber and is removed from this pool in its heated condition via line 38. The water in the pool is e.g. at a temperature of about 145° F. In order to make it possible to adjust the final heated water temperature in the pool 35 and in line 38, a portion of this water may be re-introduced to the top of the packed bed by means of a line 40, which connects with water inlet line 32. Meanwhile, the gaseous stream, which has passed through the scrubber in counter-current contact with the water and has given up its latent heat and most of its sensible heat to the water, passes out of the scrubber via outlet 42, generally at a temperature e.g. of about 100° F. While the gaseous stream, after it leaves the dust filter is essentially clean and could be vented to the atmosphere, it may still contain various small amounts of clay particles, especially if the dust filter has developed a leak or some other malfunction has occurred. Such clay particles, which otherwise would contaminate the gaseous stream finally exhausted, are, however, automatically removed by contact with the water and the gaseous stream which eventually leaves the scrubber and is vented to the atmosphere is clean and free of such particles and presents no environmental problem.

Figure 4:
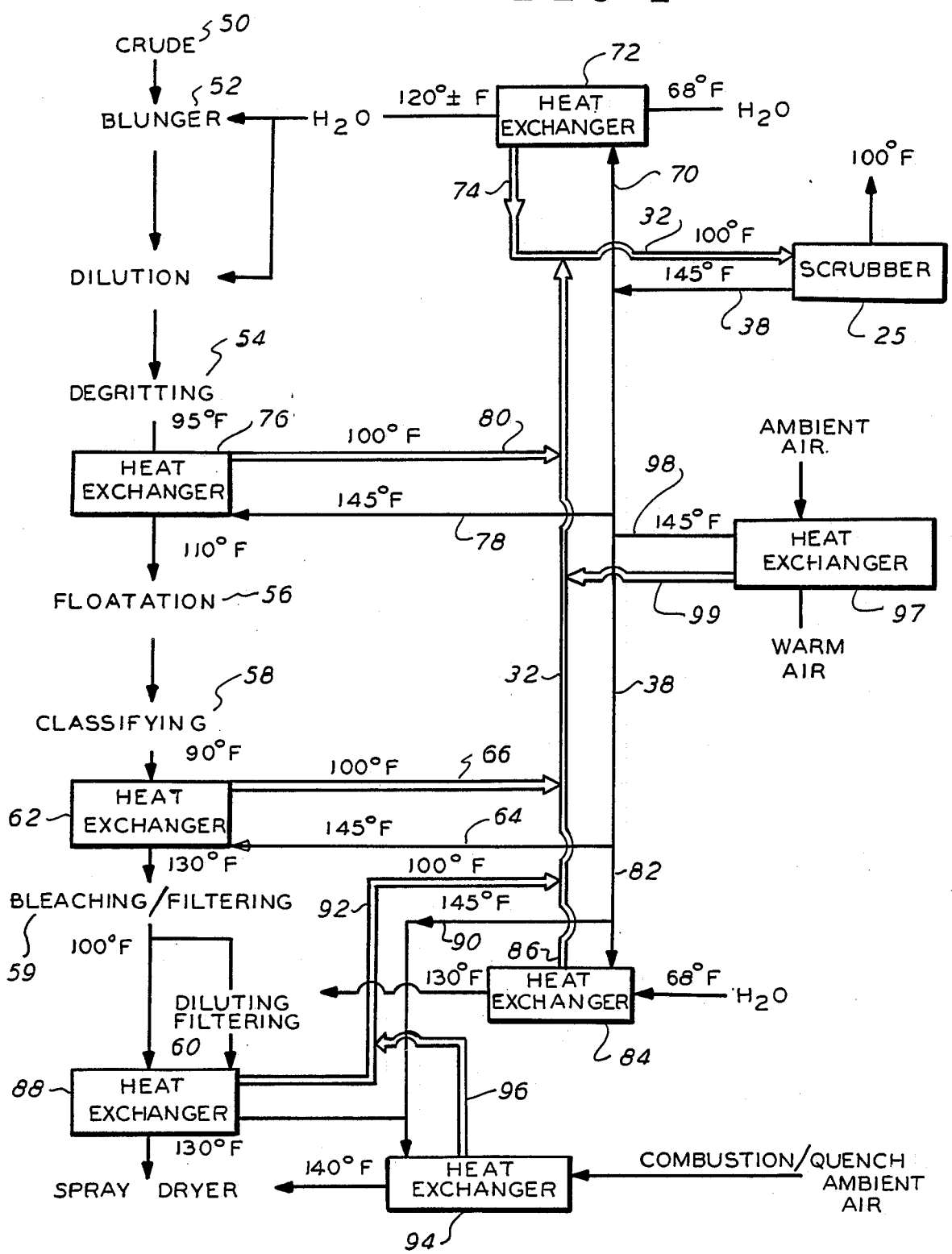
FIG. 4 is a schematic flow diagram illustrating the integration of a kaolin-processing system with the scrubber, spray dryer, calciner and air heater shown in FIG. 1.

The heated water in line 38 is thereupon efficiently and effectively utilized and integrated with the processing of the kaolin upstream of the spray drying operation, thus utilizing to the practical maximum the waste heat which is contained in the gaseous stream leaving the bag or dust filter while, at the same time, facilitating the processing regimen. The conventional "wet" processing of clay involves a number of steps, some of which are optional, as seen in FIG. 4, starting with the step of blunging or the disintegration of the crude clay into fine units by the turbulent agitation of a water suspension in the presence of a suitable dispersing agent. Subsequently, the suspension from the blunger is diluted and subjected to degritting and may be subjected to flotation and the action of a magnet to remove impurities and is then classified or "fractionated". Fractionation is conventionally carried out by centrifugation of a chemically deflocculated aqueous suspension of the degritted clay. For fractionation to be effective to recover a fine particle size fraction (generally 90% finer than 2 microns) the feed to the centrifuge must be well dispersed and sufficiently dilute, for example below 50% clay solids. Flotation is typically carried out as described for example in U.S. Pat. No. 2,990,958 to Greene et al. The clay may be also chemically "bleached". In any case, since the clay suspension or "slip" now has a relatively low solids content, it must be filtered, typically in a rotary filter, before it is fed to a spray dryer, in order to reduce the load on the dryer. If, in the course of processing, the clay has had added to it an excessive amount of soluble salts which are undesired for the purposes for which it is eventually to be put, it may be diluted and subjected to a second filtration before it is fed to the spray dryer.

Referring now to FIG. 4, there are shown representative processing steps and operations upstream of the spray dryer. Crude kaolin clay 50 is charged to the blunger 52 along with water which dilutes the feed to the blunger and further dilutes its effluent, the effluent then goes through a degritting step shown at 54, and may be subject to an optional flotation at 56, after which it is subjected to classifying at 58 and then to bleaching and filtration at 59. Part of the filter cake from the filtering step is diluted and subjected to a second filtering step at 60. This dilution and subsequent filtering is to remove soluble salts which may have increased to an objectionable quantity. The amount of the filter cake which is diverted to the dilution step can vary but, when it is applied, it is ordinarily of the order of 50%. The filter cakes from the two filtrations then represent the kaolin slurry which is fed to the spray dryer as seen in FIG. 1. Although only one spray dryer is illustrated, several spray dryers, as previously mentioned, can be employed in tandem and the gases from several, e.g. two, of them can be fed to the scrubber.

In accordance with the invention, the heated water issuing from the scrubber is primarily employed in connection with the filtering operation, although it can also be employed for other purposes, as will be described hereinafter. Its application for filtering is of particular importance because it materially facilitates the filtering as well as supplying heat to the slurry which will eventually be fed to the spray dryer and thus require less heat input to remove its water content. Referring again to FIG. 4, the heated water from the scrubber 25 (line 38) is supplied to a heat exchanger 62 through which the crude suspension, after having been subjected to the classifying step, is passed. This raises the temperature of the suspension materially as it is fed to the bleaching and filtering step 59. The heated water from line 38 enters through line 64 and leaves heat exchanger 62 through line 66, which returns it to water inlet line 32 of the scrubber, so that a complete circuit is made. The water produced by the scrubber is recirculated to it and the heated water is utilized to its fullest. The heated water can, however, have other important uses in integrating the upstream processing of the crude clay with the spray drying operation and the scrubber. For example, a line 70 can lead from line 38 as it issues from the scrubber 25 and feed heated water to heat exchanger 72 for transferring part of its heat to water at ambient temperature which is fed to the blunger and is also fed to the dilution step following the blunger. The return line from heat exchanger 72 is line 74, which joins line 32 in returning the water to the scrubber 25.

In like manner, some of the heated water in line 38 can be diverted to a heat exchanger 76 via a line 78 to heat the crude clay suspension issuing from the degritting step. The return line 80 from heat exchanger 76 connects with line 32 and returns the employed heated water to the scrubber. In an operation comparable to that carried out following the blunger, wherein the clay suspension is diluted, some of the heated water in line 38 can be diverted through line 82 into a heat exchanger 84, which is also fed with water at ambient temperature which is used to dilute the filter cake that is being subjected to a second filtration as discussed above. From heat exchanger 84 a return line 86 connects with line 32. The filter cake suspension to be fed to a spray dryer or dryers can pass through a heat exchanger 88 and receive heat from some of the heated water from the scrubber, which is fed to it via line 70, and returned to the scrubber via line 92, which connects with line 32. As previously mentioned, the heated water can be used for space heating and can be used, for example, to preheat combustion/quench air to a spray dryer. For example, as seen in the drawing, combustion/quench air going to the spray dryer passes through a heat exchanger 94 fed by the warm water in line 90 via line 96. A heat exchanger 97 for heating air for space heating receives the warm water through line 98 from line 38 and and returns the water to line 32 through line 99.

All in all, in accordance with this invention, the spray-drying operation is facilitated, the removal of fines is made extremely effective, and the filtering of the crude clay slurry to provide the feed to spray dryers is improved, all by reason of the integration of the kiln, the spray dryer, the dust filter, and the scrubber in a unitary, inter-cooperative system.

EXAMPLE

This Example illustrates the relatively enormous savings in heat energy, and in recovered kaolin, that can be achieved by the practice of the invention. In particular, a system generally in accord with that shown in FIGS. 1-4 was utilized, except that in order to initially establish control conditions, no heat recovery from the calciner was utilized. The conditions present were such that the inlet temperature to the dryer, i.e. in duct 7, was 1100° F., and the outlet temperature in duct 10 was at 200° F. The evaporation rate at the drier was 26,800 pounds per hour. In order to achieve this evaporation rate under control conditions, it was found that 427.4 thermal units per hour were required, i.e. a commensurate fuel input was needed.

In order to demonstrate the effectiveness of the invention, the operating conditions specified for the control remained unchanged, including the mentioned evaporation rate, except that the arrangement was such that the exhaust gases from the calciner were fed as illustrated in FIG. 1 to the spray dryer, i.e. in accordance with the invention. Stabilization was achieved in a matter of minutes, and measurements were thereupon undertaken. It was found that the fuel input in order to maintain the same evaporation rate had decreased to correspond to a need of but 376.8 thermal units per hour, thereby providing a net saving of 50.6 thermal units per hour. It will be evident that this large reduction in required thermal units, when multiplied over the number of hours of operation of a single calciner for a year, translates into a relatively enormous fuel saving. At the same time, the gaseous effluent in line 16 from the dust filter at 200° F. after direct countercurrent contact with the water at 100° F. fed to scrubber 25 raised the temperature of the water to 145° F. This heated water when fed to exchanger 66 upstream of the filtering operation, raised the temperature of the clay dispersion from 90° F. to 130° F. and was itself cooled to 100° F. for return to the scrubber inlet. Heat loss during the bleaching/filtering operation and during the filter cake dilution and filtering was restored to 130° F. for feeding to the spray dryer 1 by means of the heated water in exchanger 88, which water was thereby cooled to 100° F. Meanwhile, while being subjected to the several operations upstream of the filtering operations, the temperature of the crude clay slurry was gradually raised from its original ambient temperature. Thus, the water heated in exchanger 72 was at 120° F. when fed to the blunger and when used for the blunger effluent dilution but the slurry by the time it reached heat exchanger 76 was at a temperature of 95° F. and was there heated to 110° F. In heat exchanger 62, the slurry, while had been cooled by the processing steps, including classifying and was at 90° F., had its temperature raised, as above-mentioned, to 130° F. The dilution water passing through heat exchanger 84 was also raised in temperature to 130° F. from its ambient condition. As it issued from all of the heat exchangers, and was recirculated to scrubber 25 for re-heating, the water was at approximately 100° F. The net effect of the foregoing was to raise the temperature of the feed to spray dryer 1, without the input of extraneous heat energy, so that a hydrous spray dryer now needed only 334.1 thermal units per hour to maintain the same evaporation rate. Other temperatures observed in a typical operation are shown on the drawing.

It will also be appreciated tat the fuel savings evidenced in the present Example are based upon use of a single calciner of a given capacity. Depending upon such factors as the number of calciners in the system and the capacities of each, fuel savings considerably greater than in this Example can be achieved, e.g. at least as high as 40 to 60% of dryer feed and 80 to 100% of fuel required for process or space heat.

Further, however, it was found that in the control system as aforementioned, and utilizing a conventional total calciner dust removal operation, e.g. in water, the calciner dust being lost was approximately 800 pounds per hour. Utilizing the arrangement as shown in FIGS. 1 and 2, this 800 pounds per hour of dust was entirely reclaimed. Again, it will be appreciated that the rate of recovery (here involving but a single calciner) is so high as to produce enormous quantities of recovery of feed in the course e.g. of a yearly operation of such a calcining system.

It will be further appreciated that while the systems depicted in FIGS. 1 and 2 are based upon use of but a single calciner, a plurality of calciners may be readily utilized in the invention, with each kiln being connected by suitable ducts to a single spray dryer, and controls provided as are well known in the art, for separately controlling the operations of the individual kilns and the interconnecting to the remaining portions of the system.

While the present invention has been set forth in terms of specific embodiments thereof, it will be understood in view of this disclosure, that numerous variations upon the same are now enabled to those skilled in the art, which variations yet reside within the scope of the present teaching. Thus, for example, while the present invention has been particularly described in connection with its use in kaolin processing, it may also be usefully employed in the processing of other particulate minerals wherein similar calcining and drying arrangements are provided. Accordingly, the invention is to be broadly construed, and limited only by the scope and spirit of the claims now appended hereto. In particular, the temperatures specified are representative and for illustrative purposes only and are not to be taken as limitative of the invention.

What is claimed is:

1. In the process for production of a calcined kaolin clay wherein an aqueous kaolin clay slurry is subjected to at least one filtration process to produce an aqueous kaolin clay slurry having a solids content in the range of 40 to 60 weight percent, and said aqueous kaolin clay slurry is dried in a spray dryer which is provided with heated gases from a combustor, and then calcined in a calciner; the improvement which comprises: drying said aqueous kaolin clay slurry in the spray dryer by cycling the hot exhaust gases and entrained calciner kaolin dust from said calciner back to said spray dryer by joining the said hot exhaust gases and calcined kaolin dust with the said heated combustor gases being provided to said spray dryer; recovering dried kaolin particles from the spray dryer and recovering calciner and kaolin dust from the gases exiting from said spray dryer for use as feed for said calciner; bringing the gaseous effluent thereby produced from said spray dryer into direct counter-current contact with water in a scrubber to heat said water and remove any remaining particles and dust; and utilizing the resultant heated water to heat the feed to said filtration process.

2. The process as set forth in claim 1 in which at least one dust bag is provided connected to the interior of the spray dryer to receive the said gases exiting therefrom, said kaolin and calciner dust being collected in said dust bag.

3. The process as set forth in claim 2 in which the dried kaolin particles and calciner dust are mixed, the mixture passed to a calciner and the product of calcination is recovered.

4. The process as set forth in claim 2 in which the mixture of dried kaolin particles and kaolin dust is pulverized, then calcined, and the product of calcination is pulverized and recovered.

5. The process as defined in claim 1, wherein said heat-exchange contact between said gaseous effluent and said water is effected by passing the two counter-currently through a packed bed with said water flowing downwardly through said bed and said effluent flowing upwardly therethrough, and the resultant heated water is collected.

6. The process as defined in claim 1, wherein said heat-exchange contact between said gases and said water is effected by passing the two counter-currently through a packed bed with said water flowing downwardly through said bed and said gases flowing upwardly therethrough, and the resultant heated water is collected.

7. A method in accordance with claim 1, in which the said process for production of said calcined kaolin clay includes a bleaching and filtering step which precedes the calcination step; and wherein said resultant heated water is provided to a heat exchanger for heating a suspension of the kaolin prior to said bleaching and filtering step.

8. A process in accordance with claim 7, in which said process for producing said calcined kaolin clay includes an initial step of blunging a crude kaolin with water, and wherein said resultant heated water from said counter-current heat exchange is fed to a dilution step following said blunging.

9. A method in accordance with claim 8, further including a degritting step following said blunging and dilution steps, and wherein said resultant heated water is fed to a heat exchanger for heating the crude clay suspension from said degritting step.

10. A process for production of calcined kaolin clay in accordance with claim 1, wherein said filtration step forms a filter cake and said filter cake is subjected to further processing followed by a second filtration; and wherein said resultant heated water is fed to a heat exchanger which is also fed with water at ambient temperature to dilute the filter cake for said second filtration.

11. A method in accordance with claim 1 for producing a calcined kaolin clay, wherein said resultant heated water is additionally used to preheat combustion and/or quench air which are provided to said spray dryer.

12. In the method for producing a calcined kaolin product, wherein an aqueous kaolin clay slurry is filtered in at least one filtration process to increase the solids content, the filtered slurry is fed to a spray dryer which is provided with heated gases from a combustor, at least a portion of the dried kaolin product from said spray dryer is fed to a calciner; and the calcined product is recovered; the improvement enabling recovery of heat energy and calciner dust from said calciner, comprising:

cycling the hot exhaust gases and entrained calciner dust from said calciner back to said spray dryer by joining the said hot exhaust gases and calciner kaolin dust with the said heated combustion gases being provided to said spray dryer; collecting said calciner dust from the gases exiting said spray dryer and supplying said calciner dust together with at least a portion of the said dried kaolin product as feed to said calciner, bringing said gases exiting said spray dryer after collection of said dust into direct counter-current contact with water in a scrubber to heat said water and remove any remaining particles and dust, and utilizing the resultant heated water to heat the feed to said filtration process.

13. A method in accordance with claim 12, wherein the calciner dust from said dryer is collected in a dust bag connected to receive the gaseous exhaust from the interior of said spray dryer.

14. In the process for production of a calcined kaolin clay pigment in which a slurry of kaolin and water is subjected to at least one filtration process; and wherein, as an aqueous slurry having a solids content in the range of 40 to 60 weight percent, said slurry is dried in a spray dryer by heated gases from a combustor, and then calcined in a calciner; the improvement which comprises: drying said slurry in the spray dryer by cycling the hot exhaust gases and entrained calciner kaolin dust from said calciner back to said spray dryer by joining the said hot exhaust gases and calcined kaolin dust with the said heated combustor gases being provided to said spray dryer; recovering dried kaolin particles from said dryer and the calciner dust in the gaseous effluent from said dryer, for use as feed for said calciner; brining the said gaseous effluent thereby produced from said spray dryer into heat exchange with water in a scrubber to heat said water; and utilizing the resultant heated water to heat the feed to said filtration process.

* * * * *